US010048986B2

(12) United States Patent
Liu et al.

(10) Patent No.: US 10,048,986 B2
(45) Date of Patent: Aug. 14, 2018

(54) METHOD AND DEVICE FOR ALLOCATING BROWSER PROCESSES ACCORDING TO A SELECTED BROWSER PROCESS MODE

(75) Inventors: Hongwei Liu, Beijing (CN); Chenxi Zhao, Beijing (CN); Zhenyu Xie, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 344 days.

(21) Appl. No.: 14/000,045

(22) PCT Filed: Feb. 6, 2012

(86) PCT No.: PCT/CN2012/070908
§ 371 (c)(1),
(2), (4) Date: Aug. 23, 2013

(87) PCT Pub. No.: WO2012/109961
PCT Pub. Date: Aug. 23, 2012

(65) Prior Publication Data
US 2014/0007126 A1    Jan. 2, 2014

(30) Foreign Application Priority Data
Feb. 18, 2011    (CN) .......................... 2011 1 0040827

(51) Int. Cl.
*G06F 9/50*    (2006.01)
*G06F 17/30*   (2006.01)

(52) U.S. Cl.
CPC .......... *G06F 9/50* (2013.01); *G06F 17/30899* (2013.01)

(58) Field of Classification Search
None
See application file for complete search history.

(56) References Cited

U.S. PATENT DOCUMENTS 6,122,744 A * 9/2000 Rashkovskiy et al. ........ 713/300
8,291,078 B2 * 10/2012 Fisher et al. ................... 709/226
2009/0150898 A1 * 6/2009 Sohn et al. .................... 718/105
(Continued)

FOREIGN PATENT DOCUMENTS

CN    101145111 A    3/2008
CN    101853102 A    10/2010
CN    101930719 A    12/2010
(Continued)

OTHER PUBLICATIONS

Chromium Developer Documentation: Process Models pp. 1-5. Pub. Nov. 14, 2009. http://web.archive.org/web/20091114065623/ http://www.chromium.org/developers/design-documents/process-models.*
(Continued)

*Primary Examiner* — Benjamin C Wu
*Assistant Examiner* — Michael W Ayers
(74) *Attorney, Agent, or Firm* — Troutman Sanders

(57) ABSTRACT

The present invention relates to a method and device for allocating a browser process. The method comprises: first, obtaining data related to a current system operating environment, and then allocating a browser process based on the data. The present invention allocates the browser process intelligently according to the current system operating environment, maximally improving the performance in use of the browser, and can be applied in any kind of electronic devices.

10 Claims, 3 Drawing Sheets

(56) References Cited

U.S. PATENT DOCUMENTS

2012/0072913 A1* 3/2012 Uola et al. .................. 718/100
2013/0160024 A1* 6/2013 Shtilman ............... G06F 9/5083
　　　　　　　　　　　　　　　　　　　　　718/105

FOREIGN PATENT DOCUMENTS

| CN | 101968838 A | 2/2011 |
|----|-------------|--------|
| WO | 2010101592 A1 | 9/2010 |
| WO | 2011016665 A1 | 2/2011 |

OTHER PUBLICATIONS

How to prevent a browser occupying too much resource?, PC World, 2010, No. 3, p. 102.
Muchmore, M.; Deng, Qinghua; How to choose the optimum web browser, Software World, 2009, No. 9, pp. 78-89.
Written Opinion of the International Searching Authority dated Apr. 26, 2012 in connection with PCT/CN2012/070908.
International Search Report dated Apr. 26, 2012 in connection with PCT/CN2012/070908.

* cited by examiner

METHOD AND DEVICE FOR ALLOCATING BROWSER PROCESSES ACCORDING TO A SELECTED BROWSER PROCESS MODE

BENEFIT CLAIMS

This application is a US National Stage of International Application No. PCT/CN2012/070908 filed 6 Feb. 2012, which claims the benefit of CN 201110040827.1, filed 18 Feb. 2011.

FIELD OF THE INVENTION

The invention relates to the field of internet technology, and in particular, to a method and device for allocating a browser process.

BACKGROUND OF THE INVENTION

There are three kinds of process modes with respect to existing browser processes, namely, a single-process mode, a multi-process mode, and a hybrid process mode.

In the single-process mode, all pages are run in one and the same process; and nowadays most IE kernel browsers utilize the single-process mode. An advantage of the single-process mode is that when multiple pages are opened, fewer resources are occupied. A disadvantage of the single-process mode is that it is unable to solve the problem of web page resource leakage, and when there occurs such a circumstance in which a certain web page crashes and is of suspended animation, the whole device will easily be implicated, e.g., the whole browser will easily be implicated.

In the multi-process mode, each page is run in a separate process. An advantage of the multi-process mode is that it is able to thoroughly solve the problem of page resource leakage, and when a problem appears in a page, there is no interference between individual pages. A disadvantage of the multi-process mode is that when multiple pages are opened, more resources are occupied.

In the hybrid process mode, processes may be created dependent on the number of pages opened. Taking browser as an example, usually the browser is set such that nine pages may be run in one and the same process. In the hybrid process mode, fewer resources are occupied when multiple pages are opened, the problem of page resource leakage can be resolved better, and there is also a good performance when a page crashes. Therefore, the hybrid process mode achieves a relatively balanced status between the problem of page resource occupancy and the problem of page resource leakage. However, since there are thousands upon thousands of users on the internet, and the performance of many users' computers is different, the hybrid mode cannot be fully adapted to each kind of computer. For example, such a hybrid process mode is not suitable for a browser in a computer system having a single-core CPU.

On the internet, many users are just simple consumers of a computer, usually merely do some simple operations on the internet, and have a little knowledge of computer and internet. Thus, many users have no idea of the performance of their own machines at all, and do not even know how to select a process mode in a browser according to the performance of a computer. Moreover, still some computer users are busy in work, and have no time to care about selecting an optimal process mode for the browsers in their computers.

SUMMARY OF THE INVENTION

The invention provides a method and device for allocating a browser process which can solve the above problems.

In a first aspect, the invention provides a method for allocating a browser process, which method obtaining data related to a current system operating environment; and allocating the browser process based on the data.

Preferably, the process mode of the browser process comprises at least two of a single-process mode, a hybrid process mode, and a multi-process mode.

Preferably, the step of allocating the browser process based on the data comprises: based on the data, selecting a process mode from the process modes of the browser process, and allocating the browser process according to the selected process mode.

Preferably, the data related to the current system operating environment comprises one or more of the number of CPU cores, the main frequency of CPU, and the system memory.

Preferably, the number of CPU cores of the current system is obtained by the function GetSystemInfo.

Preferably, the system memory of the current system is obtained by the function GlobalMemoryStatusEx.

Preferably, the main frequency of CPU in the current system is obtained by a record in the registry of the current system. More preferably, the step of accessing a record in the registry further comprises opening a corresponding key in the registry by the function RegOpenKeyEx, querying the value of a related item under the key by the function RegQueryValueEx, and closing the registry by the function RegCloseKey.

Preferably, the path of the registry is:
HKEY_LOCAL_MACHINE\HARDWARE\DESCRIPTION\System\CentralProcessor\0\~MHz; wherein "~" in "~MHz" indicates the obtained main frequency of CPU.

Preferably, the process mode of the browser is switched according to a preset policy.

Preferably, the process mode of the browser is set according to the preset policy in the course of installing the browser.

Preferably, the process mode of the browser is configured according to the preset policy at a first star-up of the browser.

Preferably, the preset policy is to configure the browser into the single-process mode when the CPU in the current system is a single-core CPU. And/or, preferably, the preset policy is to configure the browser into the hybrid process mode or the multi-process mode depending on the main frequency of CPU or the current system memory, when the CPU of the current system is a multi-core CPU and the main frequency of CPU or the current system memory is within a set threshold.

Preferably, the data related to the current system operating environment comprises data related to a page resource consumption situation, and the browser process is allocated according to the page resource consumption situation. More preferably, the page resource consumption situation is determined according to a page resource type. More preferably, the page resource consumption situation is determined according to a data loading amount.

In a second aspect, the invention provides a device for allocating a browser process, which device comprising a data obtaining module and a process allocating module, wherein the data obtaining module is adapted to obtaining data related to a current system operating environment; and the process allocating module is adapted to allocating the browser process based on the data obtained by the data obtaining module.

Preferably, the process mode of the browser process comprises at least two of a single-process mode, a hybrid process mode, and a multi-process mode.

Preferably, the process allocating module is adapted to, based on the data, selecting a process mode from the process modes of the browser process, and allocating the browser process according to the selected process mode.

Preferably, the data related to the current system operating environment comprises one or more of the number of CPU cores, the main frequency of CPU, and the system memory.

Preferably, the process allocating module comprises a module for switching the process mode of the browser according to a preset policy.

Preferably, the preset policy is to configure the browser into the single-process mode when the CPU in the current system is a single-core CPU. And/or, preferably, the preset policy is to configure the browser into the hybrid process mode or the multi-process mode depending on the main frequency of CPU or the current system memory, when the CPU of the current system is a multi-core CPU and the main frequency of CPU or the current system memory is within a set threshold.

Preferably, the data related to the current system operating environment comprises data related to a page resource consumption situation, and the process allocating module allocates the browser process according to the page resource consumption situation. More preferably, the page resource consumption situation is determined according to a page resource type. More preferably, the page resource consumption situation is determined according to a data loading amount.

The present invention allocates the browser process intelligently according to the current system operating environment, maximally improving the performance in use of the browser. The invention brings about convenience to users, leading to a better user experience.

BRIEF DESCRIPTION OF THE DRAWINGS

In the following the particular embodiments of the invention will be described in more detail with reference to the drawings, in which.

DETAILED DESCRIPTION OF THE INVENTION

Figure 1:
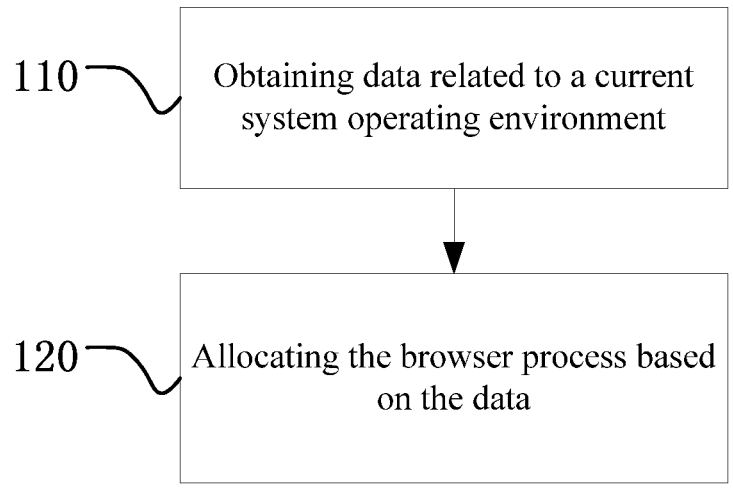
FIG. 1 is a flow chart of a method for allocating a browser process of an embodiment of the invention.

FIG. 1 is a flow chart of a method for allocating a browser process of an embodiment of the invention.

In step 110, obtaining data related to a current system operating environment.

In an example, the data related to the current system operating environment comprises the number of CPU cores, the main frequency of CPU, and the system memory.

In another example, the data related to the current system operating environment comprises data related to a page resource consumption situation.

In step 120, allocating the browser process based on the obtained data.

It needs to be noted that in the invention the obtaining of data as well as the allocation of browser process is not limited to be done only by the browser, and may also be accomplished by a dedicated plug-in or module or device.

Figure 2:
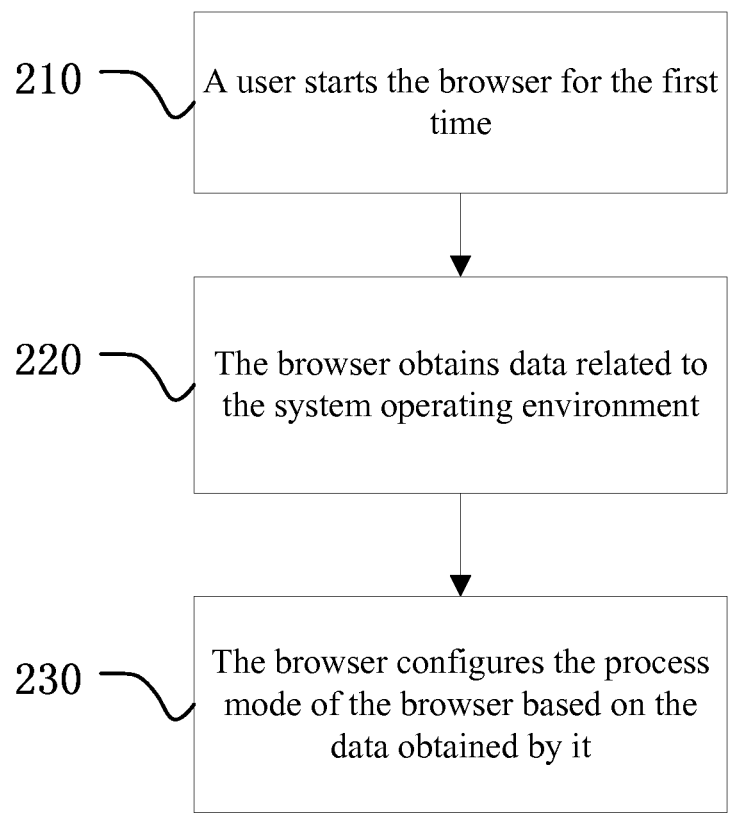
FIG. 2 is a flow chart of a method for switching a process mode of a browser of a preferred embodiment of the invention.

FIG. 2 is a flow chart of a method for switching a process mode of a browser of an embodiment of the invention, wherein the process mode of the browser comprises a single-process mode, a multi-process mode, and a hybrid process mode. When allocating the browser process, an appropriate process mode is selected based on the data related to a current system operating environment, and in turn a process is allocated for the browser according to the selected process mode. Furthermore, the process mode of the browser may also only comprise any two of the single-process mode, the multi-process mode, and the hybrid process mode. The allocation of browser process in the two process modes may be implemented by those skilled in the art with reference to this embodiment.

In step 210, a user starts the browser in a system (e.g., a computer system, a mobile phone system, etc.) for the first time. That is to say, the user opens the browser for the first time after installing the browser. The step 210 is an optional step.

In step 220, the browser obtains data related to the operating environment of the system, for example, obtains the number of CPU (central processing unit) cores, the main frequency of CPU, or the system memory size in the system.

In an example, the browser obtains the number of CPU cores of the current system (i.e., a system to which the browser belongs) by the function GetSystemInfo.

In another example, the browser obtains the memory size of the current system (i.e., a system to which the browser belongs) by the function GlobalMemoryStatusEx.

In yet another example, the browser obtains the main frequency of CPU by a record in the registry of the current system (i.e., a system to which the browser belongs). Therein, the way of the browser accessing a record in the registry in a system to which it belongs is to firstly open a corresponding key in the registry by the function RegOpenKeyEx, then query the value of a related item under the key by the function RegQueryValueEx, and finally close the registry by the function RegCloseKey.

Moreover, the path of the registry in the current computer system is:

HKEY_LOCAL_MACHINE\HARDWARE\DESCRIPTION\System\CentralP rocessor\0\~MHz wherein "~" in "~MHz" indicates the main frequency of the current system obtained by the browser.

It needs to be noted that the invention is not limited to obtain the number of CPU cores, the system memory, and the main frequency of CPU in the above-mentioned ways.

In step 230, the browser configures the process mode of the browser based on the number of CPU cores, the main frequency of CPU, and the system memory size obtained by the browser and according to a preset policy of the browser, and then save such that the browser has the process mode configured this time when the user opens the browser again later.

That is to say, after the user opens the browser for the first time, the browser will configure its process mode and save the configuration result. After completion of configuration for the first time, the browser will neither obtain the number of CPU cores, the main frequency of CPU, and the system memory size again, nor configure the process mode of the browser again when the user opens the browser again later, but hold the process mode configured for the first time by the browser, unless the user initiatively modifies the process mode of the browser. For a particular way of modification, reference is made to FIG. 3 which is a schematic diagram of an option configuration of a process mode of a browser in a prior art.

Figure 3:
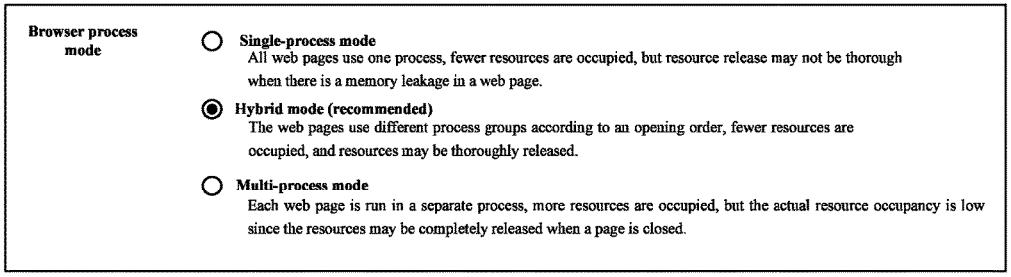
FIG. 3 is a schematic diagram of an option configuration of a process mode of a browser in a prior art.

In FIG. 3, a user may select a process mode of a browser by entering the process mode in a "360 secure browser option" module of the browser. And the user may select any one of process modes comprising a single-process mode, a hybrid process mode, and a multi-process mode.

In an embodiment of the invention, the preset policy mentioned in step 230 is to configure the browser into the single-process mode when the CPU in the current system is a single-core CPU.

In another embodiment of the invention, the preset policy mentioned in step 230 is to configure the browser into the hybrid process mode or the multi-process mode depending on the main frequency of CPU or the current system memory, when the CPU of the current system is a multi-core CPU and the main frequency of CPU or the current system memory is within a set threshold.

It needs to be noted that the above two preset policies may also exist simultaneously, and one of the two preset policies may be selected by the system according to whether the CPU in the current system is a single-core or multi-core CPU.

Further, the process mode of the browser may also be set in the course of installing the browser.

Figure 4:
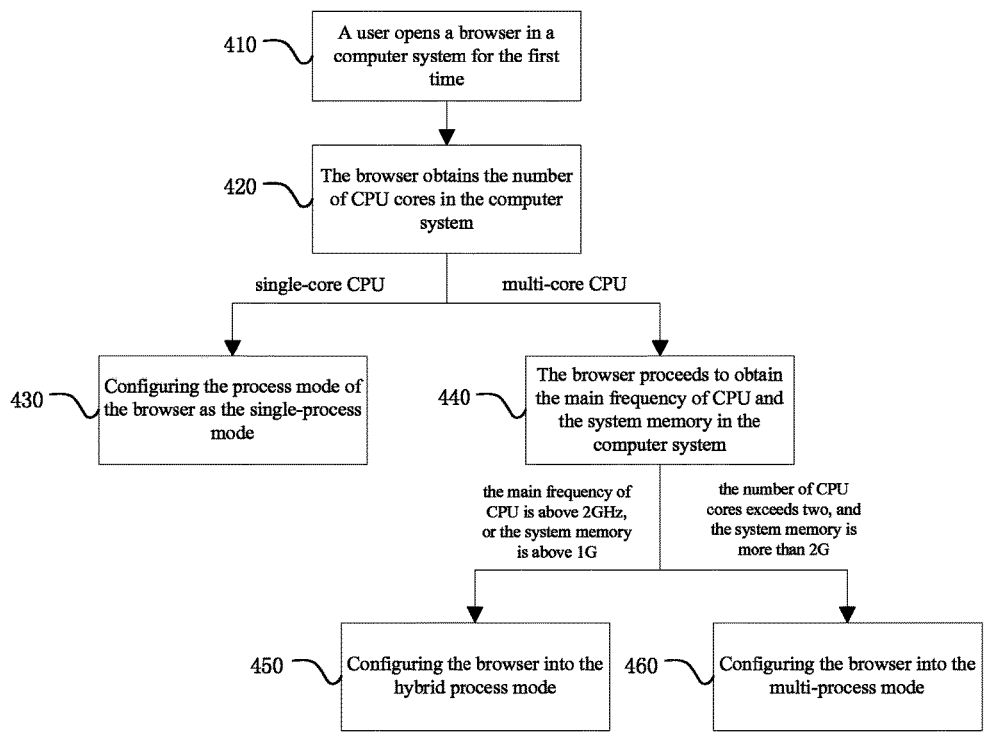
FIG. 4 is a flow chart of a method for switching a process mode of a browser of a preferred embodiment of the invention.

FIG. 4 is a flow chart of a method for switching a process mode of a browser of a preferred embodiment of the invention.

In step 410, a user opens a browser in a computer system for the first time.

In step 420, the browser obtains the number of CPU cores in the computer system.

In particular, the browser obtains the number of CPU cores of the current computer system by the function GetSystemInfo.

In step 430, if the CPU in the computer system is a single-core CPU, the browser configures its process mode as single-process mode, and then save, such that the browser will still have such a single-process mode when opened again later, unless the user initiatively changes the process mode of the browser.

In step 440, if the CPU in the computer system is a multi-core CPU, the browser proceeds to obtain the main frequency of CPU and the system memory in the current computer system.

In particular, the browser accesses the registry in the current computer system by the functions RegOpenKeyEx, RegQueryValueEx, and RegCloseKey, and then obtains the main frequency of CPU in a path in the registry: HKEY_LOCAL_MACHINE\HARDWARE\DESCRIPTION\System\CentralProcessor\0\~M Hz. Therein, "~" in "~MHz" indicates the main frequency of the current computer system obtained by the browser.

Moreover, the browser obtains the memory of the current computer system by the function GlobalMemoryStatusEx.

In step 450, if the main frequency of CPU in the current computer system obtained by the browser is above 2 GHz, or the obtained memory of the current computer system is above 1G, then the browser configures its process mode as hybrid process mode, and then save this configuration result, such that the browser will still have such a hybrid process mode when opened again later, unless the user initiatively makes a modification.

In step 460, if the number of CPU cores in the current computer system obtained by the browser is more than two, and the system memory exceeds 2G, then the browser configures its process mode as multi-process mode.

It needs to be noted that in most cases, the browser does not configure its process mode as multi-process mode, but is more inclined to configure it as hybrid process mode. That is to say, the process mode of the browser is configured as the multi-process mode only when the current computer system possesses an extremely excellent performance.

In an example, the browser will configure the process mode as single-process mode only when the CPU in the current computer system obtained by the browser is a single-core CPU, whereas in any other case, the browser will configure the process mode as hybrid process mode.

Figure 5:
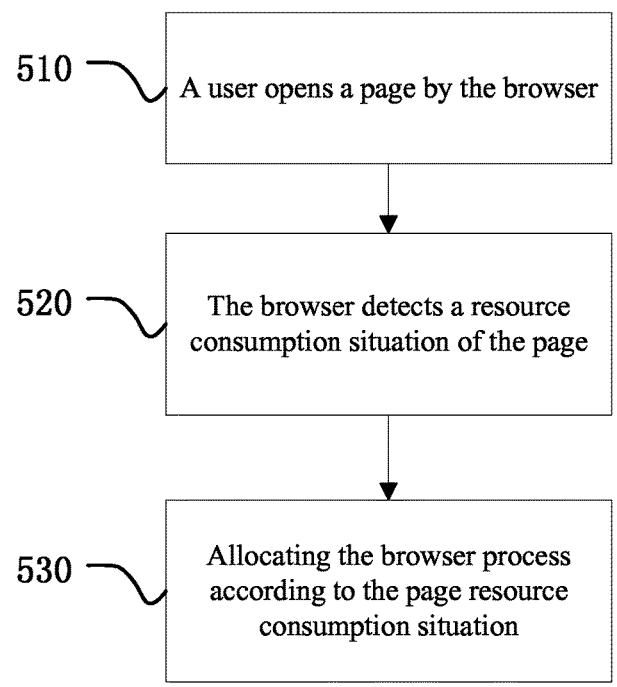
FIG. 5 is a flow chart of a method for allocating a browser process according to a page resource consumption situation of an embodiment of the invention.

FIG. 5 is a flow chart of a method for allocating a browser process according to a page resource consumption situation of an embodiment of the invention.

In step 510, a user opens a page by the browser.

In step 520, the browser obtains data related to a current system operating environment, and the data related to the current system operating environment is data related to the page resource consumption situation, and hence the browser detects the resource consumption situation of the page at this point.

In an example, the browser detects a resource type of the page, and judges the resource consumption situation of the page according to the resource type. For instance, the browser judges that the resource consumption of the page is large when it detects that a resource of a type such as video, audio, game, etc. is to be loaded in the page, and therefore, an object having a large resource consumption should be allocated to a new process, and it may be judged according to the page resource condition whether a new page opened thereafter is allocated to the original process or the mentioned new process. If the resource consumption of the new page is large, then it may be successively allocated to the new process; if the resource consumption of the new page is small, then it may be allocated into the original individual processes, however, it should be ensured that the allocation of the page will not lead to influence on the operating state of the process due to the increase of the page resources.

In another example, the browser monitors a data loading amount of the page, and judges the page resource consumption is large when the loading amount reaches a certain threshold.

In step 530, the browser process is allocated according to the page resource consumption situation.

In particular, when the browser detects that the page resource consumption is large, peeling off the part consuming a lot of resources in the page, and launching separately a new process for the content of this part, such that this part is run in the new process.

For instance, if the browser detects that video data is being loaded in the page, then the video is peeled off, and a new process is launched for the video.

Figure 6:
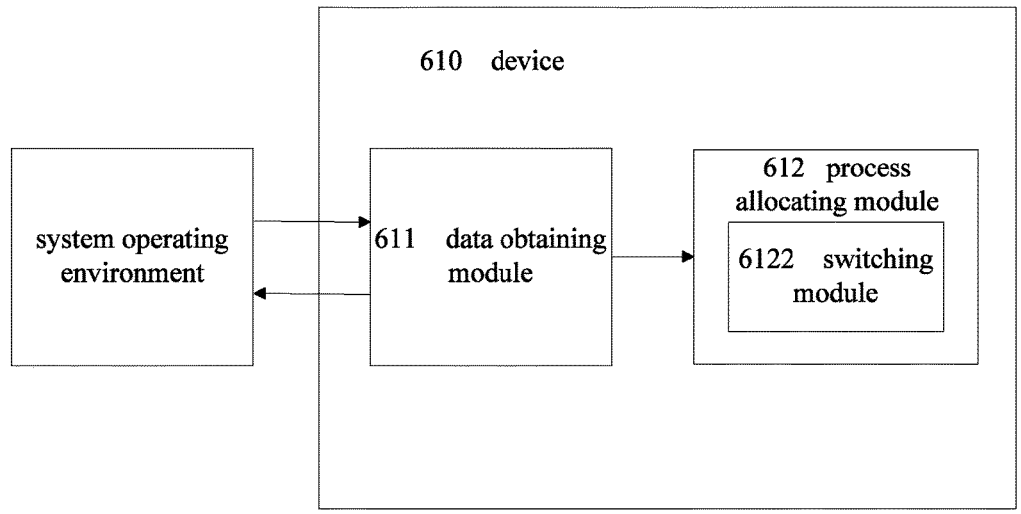
FIG. 6 is a schematic diagram of a device for allocating a browser process of an embodiment of the invention.

FIG. 6 is a schematic diagram of a device for allocating a browser process of an embodiment of the invention. The device 610 comprises a data obtaining module 611, and a process allocating module 612.

The data obtaining module 611 is adapted to obtaining data related to a current system operating environment. The process allocating module 612 allocates the browser process based on the corresponding data from the data obtaining module.

Therein, the process mode comprises at least two of a single-process mode, a hybrid process mode, and a multi-process mode.

Preferably, the process allocating module 612 is adapted to, based on the data, selecting a process mode from the process modes of the browser process, and allocating the browser process according to the selected process mode.

In an example, the data related to the current system operating environment comprises the number of CPU cores, the main frequency of CPU, and the system memory.

In another example, the data related to the current system operating environment is data related to a page resource consumption situation. Preferably, the page resource consumption situation is judged by a page resource type and/or a data loading amount in the page.

Preferably, the process allocating module 612 further comprises a switching module 6122 for switching the process mode of the browser according to a preset policy.

In an example, the preset policy is to configure the browser into the single-process mode when the CPU in the current system is a single-core CPU.

In another example, the preset policy is to configure the browser into the hybrid process mode or the multi-process mode depending on the main frequency of CPU or the current system memory, when the CPU of the current system is a multi-core CPU and the main frequency of CPU or the current system memory is within a set threshold.

The above two preset policies may also exist simultaneously, and a corresponding preset policy may be selected by the system according to whether the CPU in the current system is a single-core or multi-core CPU.

It needs to be noted that the invention is not limited to be used only in a PC (personal computer), and it may also be applied in a variety of electronic devices such as a PDA (personal digital assistant), a mobile phone, etc. Furthermore, the information transmission way in the invention may be wired, and may also be wireless.

The invention may be embodied by being recorded on a computer readable record medium, which medium comprises any medium for storing or transmitting information in a computer readable form, for example, a read-only memory (ROM), a random access memory (RAM), a magnetic disk storage medium, an optical storage medium, a flash storage medium, a transmission signal in the form of electricity, light, sound or others (e.g., a carrier wave, an infrared signal, a digital signal, etc.), etc.

The invention may be used in numerous general-purpose or dedicated computing system environments or configurations, for example, a personal computer, a server computer, a handheld device or portable device, a tablet type device, a multi-processor system, a microprocessor based system, a set-top box, a programmable consumer electronic device, a network PC, a minicomputer, a large-scale computer, a distributed computing environment comprising any of the above systems or devices, etc.

Clearly, there may be many variations to the invention described herein without departing from the true spirit and scope of the invention. Therefore, all changes evident to those skilled in the art should be embraced within the scope encompassed by the claims. The scope claimed by the invention is only defined by the claims.

The invention claimed is:

1. A method automatically executed by a computing device for allocating browser processes in a browser running in a system operating environment, comprising:
   obtaining data in the computing device related to the system operating environment, the data comprising number of CPU cores, main frequency of CPU and amount of system memory;
   selecting a hybrid process mode for the browser to run in the computing device, from process modes including a single-process mode, the hybrid process mode, and a multi-process mode;
      wherein the single-process mode is selected when the number of CPU cores is one;
      wherein the hybrid process mode is selected when the number of CPU cores is more than one, the main frequency of CPU is greater than a frequency threshold, and the amount of system memory is greater than a first memory threshold, but less than a second memory threshold, wherein the second memory threshold is greater than the first memory threshold;
      wherein the multi-process mode is selected when the number of CPU cores is more than two, the main frequency of CPU is greater than a frequency threshold, and the amount of system memory is greater than the second memory threshold;
      wherein in the single-process mode, all pages are run in one browser process; in the hybrid process mode, pages may either run in an original browser process or run in a separate browser process; in the multi-process mode, each page is run in a separate browser process;
   saving the selected process mode; and
   allocating all browser processes according to the selected hybrid process mode until the process mode is changed manually based on the data obtained in the computing device, wherein the allocating of all browser processes is done by:
      opening a new page by a user, wherein the new page is allocated to an original first browser process of all browser processes when an amount of resource consumption of that new page is less than a first threshold, or the new page is allocated to a new second browser process of all browser processes when the amount of resource consumption of that new page is greater than the first threshold, wherein the amount of resource consumption is associated with a data loading amount of the new page; and
      monitoring the amount of resource consumption of all open pages in the browser, determining that the amount of resource consumption of one of the all open pages reaches a second threshold, peeling off a part of the one open page that is associated with a greatest resource consumption amount, and allocating that part to a new third browser process of all browser processes in the selected hybrid process mode.

2. The method for allocating browser processes as claimed in claim 1, wherein the number of CPU cores of the system is obtained by the function GetSystem Info.

3. The method for allocating browser processes as claimed in claim 1, wherein the system memory of the system is obtained by the function GlobalMemoryStatusEx.

4. The method for allocating browser processes as claimed in claim 1, wherein the main frequency of CPU in the system is obtained by accessing a record in the registry of the system.

5. The method for allocating browser processes as claimed in claim 4, wherein accessing a record in the registry comprises: opening a corresponding key in the registry by the function RegOpenKeyEx, querying the value of a related item under the key by the function RegQueryValueEx, and closing the registry by the function RegCloseKey.

6. The method for allocating browser processes as claimed in claim 4, wherein the path of the registry is:
HKEY_LOCAL_MACHINE\HARDWARE\DESCRIPTION\System\CentralProcessor\0\ ~MHz
wherein "~" in "~MHz" indicates the obtained main frequency of CPU.

7. The method for allocating browser processes as claimed in claim 1, wherein the step of allocating the browser process comprises: setting the process mode of the browser according to a preset policy in the course of installing the browser.

8. The method for allocating browser processes as claimed in claim 1, wherein the step of allocating the browser process comprises: configuring the process mode of the browser according to a preset policy at a first start-up of the browser.

9. A device for automatically allocating browser processes in a browser running in a system operating environment, comprising
a memory having instructions stored thereon;
a processor configured to execute the instructions to perform operations for allocating browser processes, comprising;
obtaining data in the device related to the system operating environment, the data comprising number of CPU cores, main frequency of CPU and amount of system memory;
selecting a process mode for the browser to run in the device from three process modes including a single-process mode, a hybrid process mode, and a multi-process mode;
wherein the single process mode is selected when the number of CPU cores is one;
wherein the hybrid mode is selected when the number of CPU cores is more than one, the main frequency of CPU is greater than a frequency threshold, and the system memory are greater than a first memory threshold, but less than a second memory threshold, wherein the second memory threshold is greater than the first memory threshold;
wherein the multi-process mode is selected when the number of CPU cores is more than two and the system memory are greater than a second memory threshold;
saving the selected process mode; and
allocating all browser processes according to the selected process mode until the process mode is changed manually, based on the data obtained in the computing device;
wherein allocating of all browser processes in the hybrid mode is done by;
opening a new page by a user, wherein the new page is allocated to an original first browser process of all browser processes when an amount of resource consumption of that new page is less than a first threshold, or the new page is allocated to a new second browser process of all browser processes when the amount of resource consumption of that new page is greater than the first threshold, wherein the amount of resource consumption is associated with a data loading amount of the new page, and
monitoring the amount of resource consumption of all open pages in the browser, determining that the amount of resource consumption of one of the all open pages reaches a second threshold, peeling off a part of the one open page that is associated with a greatest resource consumption amount, and allocating that part to a new third browser process of all browser processes in the selected hybrid process mode.

10. A non-transitory computer readable record medium which stores computer program comprising computer readable codes, and running of said computer readable codes on a computing device causes said device to carry out a method for allocating browser processes, said method comprising
obtaining data in the computing device related to the system operating environment, the data comprising number of CPU cores, main frequency of CPU and amount of system memory;
selecting a process mode for the browser to run in the computing device, from process modes including a single-process mode, the hybrid process mode, and a multi-process mode;
wherein the single-process mode is selected when the number of CPU cores is one;
wherein the hybrid process mode is selected when the number of CPU cores is more than one, the main frequency of CPU is greater than a frequency threshold, and the amount of system memory is greater than a first memory threshold, but less than a second memory threshold, wherein the second memory threshold is greater than the first memory threshold;
wherein the multi-process mode is selected when the number of CPU cores is more than two, the main frequency of CPU is greater than a frequency threshold, and the amount of system memory is greater than the second memory threshold;
wherein in the single-process mode, all pages are run in one browser process; in the hybrid process mode, pages may either run in an original browser process or run in a separate browser process; in the multi-process mode, each page is run in a separate browser process;
saving the selected process mode; and
allocating all browser processes according to the selected process mode until the process mode is changed manually based on the data obtained in the computing device;
wherein the allocating of all browser processes in the hybrid mode is done by:
opening a new page by a user, wherein the new page is allocated to an original first browser process of all browser processes when an amount of resource consumption of that new page is less than a first threshold, or the new page is allocated to a new second browser process of all browser processes when the amount of resource consumption of that new page is greater than the first threshold, wherein the amount of resource consumption is associated with a data loading amount of the new page; and
monitoring the amount of resource consumption of all open pages in the browser, determining that the amount of resource consumption of one of the all open pages reaches a second threshold, peeling off a part of the one open page that is associated with a greatest resource consumption amount, and allocating that part to a new third browser process of all browser processes in the selected hybrid process mode.

\* \* \* \* \*